United States Patent [19]

Schaal et al.

[11] Patent Number: 4,689,612
[45] Date of Patent: Aug. 25, 1987

[54] SYSTEM FOR MONITORING CONTAINERS WITH ULTRASONIC SEALS USING AUTONOMOUS TERMINALS

[75] Inventors: Alfred Schaal, Massy; Philippe LaHarrague, Boulogne, both of France; René Denis, Brebbia, Italy

[73] Assignees: Commissariat a l'Energie Atomique, France; Communau te Europeenne de l'Energie Atomique (Euratom), Luxembourg

[21] Appl. No.: 776,681

[22] Filed: Sep. 16, 1985

[30] Foreign Application Priority Data

Sep. 18, 1984 [FR] France ................... 84 14278

[51] Int. Cl.$^4$ ............................. G09F 3/03
[52] U.S. Cl. .......................... 340/572; 73/595; 73/627
[58] Field of Search ............ 340/572; 73/579, 588, 73/589, 595, 627

[56] References Cited

U.S. PATENT DOCUMENTS 4,592,236 6/1986 Battagin et al. .................... 340/572

FOREIGN PATENT DOCUMENTS 0018198 10/1980 European Pat. Off. .
0082763 6/1983 European Pat. Off. .
537065 6/1973 Switzerland .

OTHER PUBLICATIONS

500 Le Nouvel Automatisme, vol. 26, No. 19, Jan.-Feb. 1981, pp. 61-66.

Primary Examiner—Howard A. Birmiel
Attorney, Agent, or Firm—Dennis P. Clarke

[57] ABSTRACT

System for monitoring containers with ultrasonic seals.

According to the invention the seal is duplicated and comprises a transmitting transducer and a receiving transducer. The exciting signal is a voltage step applied to the transmitting transducer and the circuit able to supply said step is directly connected to the transmitting transducer without a connecting cable.

Application to the monitoring of containers containing dangerous products, precious materials, documents, etc.

3 Claims, 3 Drawing Figures

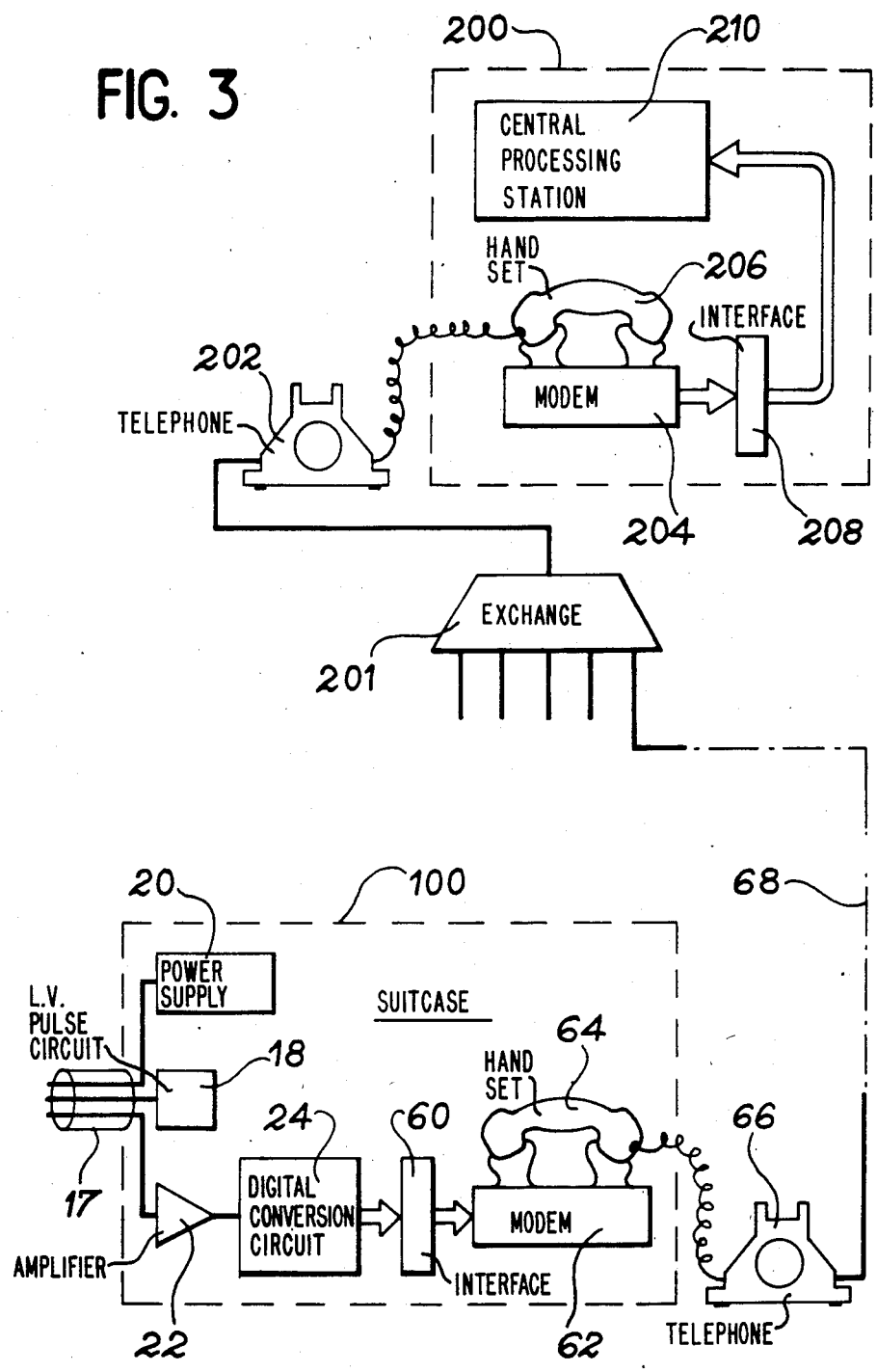

SYSTEM FOR MONITORING CONTAINERS WITH ULTRASONIC SEALS USING AUTONOMOUS TERMINALS

BACKGROUND OF THE INVENTION

The present invention relates to a system for monitoring containers with ultrasonic seals. It is used in the monitoring of containers containing dangerous products, precious materials, documents, etc.

The principle of monitoring by ultrasonic seals is known. It consists of fixing in a final manner an ultrasonic seal to a container to be monitored, said seal being provided with a unique, non-reproducible marking located in the vicinity of the pre-established breaking zone of the seal. This marking is obtained by structural irregularities of the matrix containing the seal, e.g. by material inclusions or cavities distributed in a random manner.

Generally, an ultrasonic seal comprises a transducer able to convert electrical excitation into an ultrasonic wave and vice versa. The structural irregularities on the path of the transmitted ultrasonic wave give rise to ultrasonic echoes detected by the transducer, which on return supply an electrical signal whose complex form is specific to the seal. Electronic means are provided for exciting the transducer and for collecting the electrical signal supplied by it, as well as for analysing said signal. In such a device, the ultrasonic transducer functions both as a transmitter and as a receiver, so that a seal only has one transducer.

In a prior art ultrasonic seal, the transducer receives through a supply cable a high voltage electric pulse, e.g. of 100 to 200 V, with a width close to 10 microseconds and a rise time of 50 to 100 ns. The transducer produces a sound wave, which is propogated through a delay line and partly reflected by the faults which it encounters. The wave reflected by these faults reaches the receiving transducer, which then supplies a low voltage signal. Its frequency is approximately 5 MHz and its peak value 100 mV, with a delay of 5 $\mu s$ and a duration of 10 $\mu s$. This signal forms the identity of the seal. It also contains the integrity information, bearing in mind that any significant deterioration to the seal and in particular the breaking thereof leads to a significant modification in the shape or form of the signal.

The signal received is rectified and then sampled over a few values (roughly 10 values). The values of these few samples are then digitally converted and transmitted to a processing module. The latter compares the values received (after possible digital processing) with reference values contained in a memory. It deduces therefrom the identity of the seal and checks its integrity. The processing module can initiate special procedures, such as alarms, as a function of the results of the control.

These systems are not suitable for the application envisaged by the invention, which is that of controlling a large number of containers at various times which can be widely spaced (e.g. by one year), whereby said control or inspection is to be carried out by different equipment (containers transported from one site to another).

The problem which mainly occurs in such an application is that of stability and reproducibility of the means involved for recording the "signature" of a seal, or in other words for acquiring information. Thus, if it is wished to be able to check and identify one from among many containers after an interval of one year, it is necessary that the acquisition means used are free from instabilities, fluctuations and variations. Conversely, if it is wished to be able to check the same seal with different equipment, it is necessary that the structure of the equipment is reproducible and that the signature of the seal recorded with such equipment is the same in the case of an equipment change.

The prior art systems are not suitable for this application for the following reasons. Firstly the exciting pulse, which is very narrow, can be subject to slight duration variations over a period of time, which have considerable significance on the shape of the signal supplied by the seal. This sensitivity to the width of the exciting signal is understandable if it is borne in mind that each front of the exciting pulse (front edge and then back edge) disturbs the acoustic medium in the ultrasonic seal the total signal received resulting from the interference between the two thus produced acoustic components.

Moreover and as indicated hereinbefore, there is a considerable disparity between the amplitude of the exciting signal (100 V) and that of the signal received (100 mV), so that effective electronic means must be positioned between the receiver and the seal to prevent the former being blinded at the time of transmission. However, such means are fatally effected by drift over a period of time.

Finally, the transmitter is connected to the transmitting transducer by a cable and there again variations can appear (mismatching, interference), which are prejudicial to the reproducibility of the measurement.

SUMMARY OF THE INVENTION

The invention aims at obviating these disadvantages. To this end, it recommends a particular organisation of the seal and of its excitation means, which gives the assembly a high stability and excellent reproducibility. These objectives are essentially achieved as a result of the following three features:

- the ultrasonic seal is duplicate in the sense that it comprises a transmitting transducer and a receiving transducer,
- the exciting signal of the transmitting transducer is a voltage step and no longer a short pulse,
- the circuit able to produce this exciting signal is in the immediate vicinity of the transducer.

These means are certainly able to remove the deficiencies referred to hereinbefore.

(a) The separation between the transmitting transducer and the receiving transducer ensures that the receiver is not blinded by the transmitter. To a certain extent, the actual seal plays the part of the filter (in the present case a mechanical filter).

(b) The fact that the exciting signal is a voltage step reduces risks of instability. Such a signal is now only characterized by two parameters, namely the amplitude and the rise time. However, the first is very easy to stabilise, because a d.c. voltage can be obtained without great problem using a stabilised supply. The second is not critical if it is given a value below a threshold. Any fluctuation in the rise time will lead to a change in the spectrum of the signal, which does not have a critical importance. For example, the steepening of the rise front could lead to a widening of the spectrum from 30 to 40 MHz, which has no influence on an installation operating at 5 MHz.

(c) Finally, the positioning of the exciting circuit in the vicinity of the transmitting transducer obviates any risk linked with the connecting cable. The third arrangement is linked with the second to the extent that on transmitting a voltage plateau of 100 V on a matched line, e.g. of 50 Ohms, this would require a power of 200 W, which would be prohibitive. The use of a voltage step consequently implies that the circuit generating said voltage is located in the immediate vicinity of the transmitting transducer.

An ultrasonic seal with a double transducer is not novel per se. Such a device is described in French Pat. No. 2 518 751. However, such a seal is not excited by a voltage step and is not equipped with a transmitter attached to the transmitting transducer.

The inventors have shown that if the system has the three aforementioned characteristics, it would have the stability and reproducibility required for the envisaged application. Thus, it is merely necessary to complete the installation with sampling, digitizing and processing means of a conventional nature. In other words, the inventors have been able to determine the relative importances of the different measuring means in the problem of the stability and reproducibility of the measurement and have found that the main part of the risks is linked with the seal and acquisition electronics, which was not a priori obvious.

In the envisaged application of inspecting containers at different times, particularly after transportation from one site to another, it is particularly advantageous to collect part of the reception means in an electronic "suitcase", which a controller can carry with him and to place the processing means for checking the signature of the examined seal in a central processing station to which the different suitcases can be connected by an ordinary telephone line as information processing terminals. In this variant, the terminal comprises a sampler, an analog-digital converter, a modem of a type able to ensure the transmission of digital data on a telephone line, whereby an interface is inserted between the modem and the sampler. In turn, the central processing station comprises a reception modem, means for receiving the digital data transmitted by the telephone line and means able to determine the identity and integrity of the seal corresponding to the signals received.

Such a distribution of the electronic means gives the system a great flexibility of use. However, naturally it is possible within the scope of the invention, to design a terminal which would be completely autonomous and which would itself carry out the identity and integrity controls.

BRIEF DESCRIPTION OF THE DRAWINGS

The invention is described in greater detail hereinafter relative to non-limitative embodiments and the attached drawings, wherein show:

FIG. 3 a diagram of an embodiment of an autonomous suitcase connected to a central processing station.

DETAILED DESCRIPTION OF THE PREFERRED EMBODIMENTS

Figure 1:
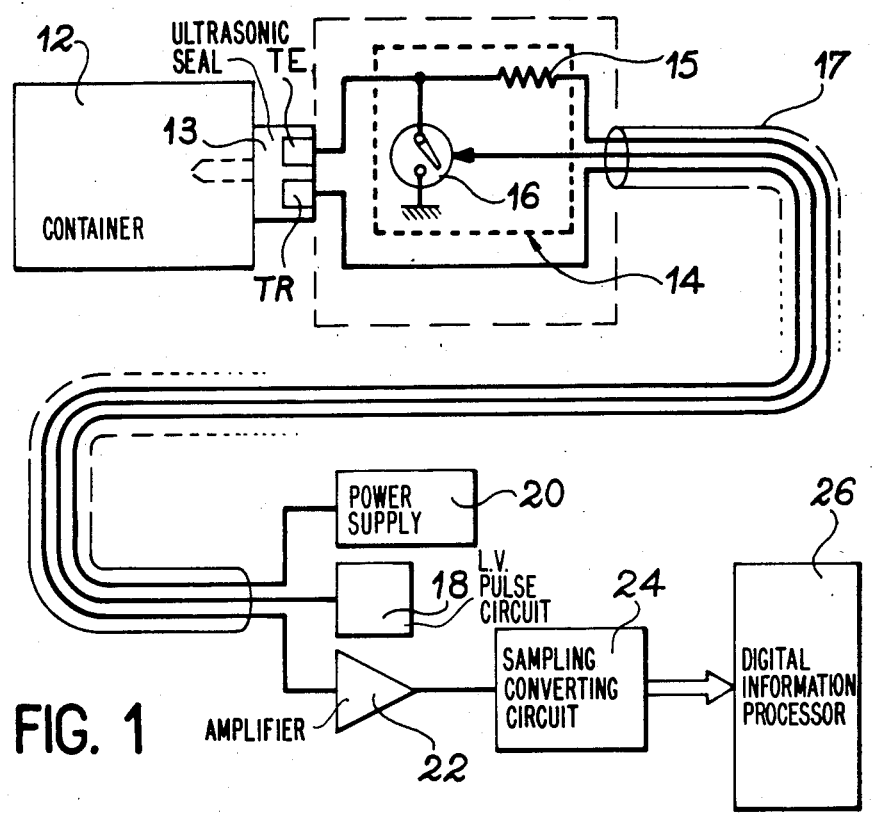
FIG. 1 a general diagram of the system according to the invention.

FIG. 1 shows a monitoring system according to the invention. A container 12 is provided with a double ultrasonic seal 13, i.e. it has a transmitting transducer TE and a receiving transducer TR. This seal is connected to a probe (in broken line form) ensuring the electrical connections with the transudcers and which contains an exciting circuit 14. As explained hereinbefore, this circuit is able to apply a voltage step to seal TE. To this end, it comprises a resistor 15, whose terminal is directly connected to the transmitting transducer TE, whilst another terminal is connected via a cable 17 to a stabilized d.c. power supply 20, which supplies a d.c. voltage of approximately 100 V. A switch 16 connects the transmitting transducer to earth. It is connected by the same cable 17 to a low voltage pulse circuit 18 (a few volts). Moreover, the receiving transducer TR is connected via cable 17 to an optionally provided amplifier 22, which is connected to a sampling-converting circuit 24, which supplies digital information processed by means 26.

This system operates in the following way. A voltage of approximately 100 V is applied to the transmitting transducer TE. When a pulse is transmitted by circuit 18, switch 16 (which in practice can be a thyristor) is closed and the voltage applied to TE is suddenly cancelled out. It is this voltage step (negative in the case described) which excites the transducer. The response of the seal is received by the receiving transducer TR and transmitted by cable 17 to amplifier 22 and to the following circuits. The low voltage pulse (approximately 5 V) closing switch 16 is applied for a sufficient period of time to ensure that the reading signal is analysed. This pulse is then cancelled out and the transducer reassumes its voltage of 100 V, with a time constant dependent on resistor 15.

Figure 2:
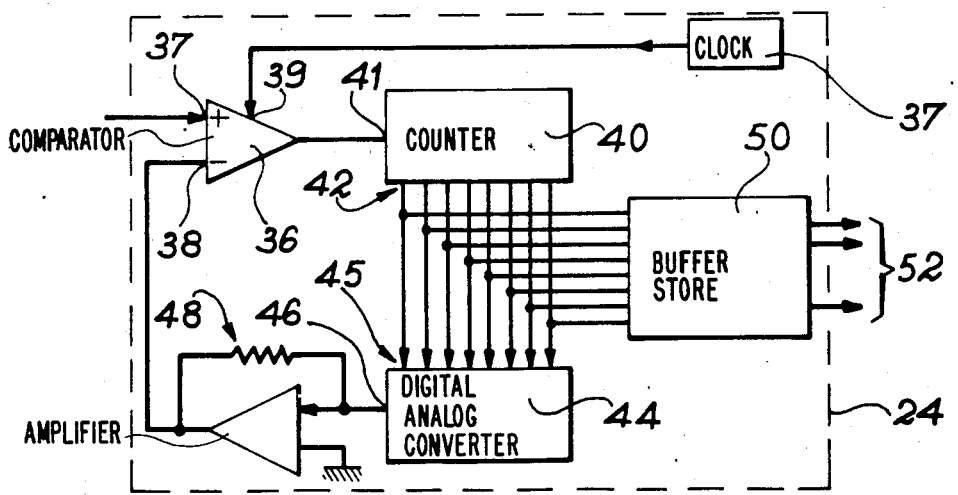
FIG. 2 the structure of a circuit for sampling and converting into digital form.

FIG. 2 illustrates an embodiment of the sampling and digital conversion circuit 24 and which comprises the following. A rapid comparator 36 having a positive input 37 receiving the signal to be sampled, a negative input 38 and a sampling control input 39, whereby said comparator can be of type AM 686. A clock 37 supplying pulses defining the sampling times. A counter 40 having an input 41 connected to the output of the comparitor and a digital output 42, whereby said counter, which is in fact a register operating on the dichotomy principle, can be of type MC 14559. A digital-analog converter 44 having a digital input 45 connected to the output 42 of the counter and an analog output 46, whereby said converter can by of type AD 561. A current-voltage converter 48 inserted between the converter output and the negative input 38 of the comparitor, whereby said converter can be an SN 72 740. A buffer store 50 having an input connected to the counter output and an output connected to a data bus 52.

This circuit functions in the following way. The signal to be sampled is applied to the input 37 of comparator 36. The signal controlling sampling is applied to input 39. If the signal to be sampled is higher than the voltage applied to the input 38 at the time when the sampling signal is applied, the comparator output passes to level 1 and increments the counter 40. The digital output of the counter is converted into an analog value, which acts as a comparison voltage applied to the comparitor input 38. By successive approximations and at the end of 8 clock pulses, the content of the counter is equal to the input signal at the sampling time. The total time per sample is in practice ten times 1.6 ms, i.e. 16 ms. The counter output 42 is an 8 wire bus. It is connected to the buffer store 50, which is of the open collector or sink type. The latter supplies the digital value of the sample to the output bus 52 in the form of a byte. The sampling can relate to 1024 points spaced by 20 ns. For a 5 MHz signal, i.e. a 200 ns cycle, in this way 10 samples are obtained per alternation. As it is necessary to take account of the sign of the sampled signal (because this is the high frequency signal and not the rectified signal), the samples are coded between −128 and 127, i.e. 256 points, which requires 8 bits per sample or 1 byte.

As stressed hereinbefore, the identity control and integrity means are advantageously collected together in a central processing station accessible by telephone line. In this variant, the organisation of the system is that of FIG. 3. All the aforementioned members 18,20,22,24 are collected together in a suitcase 100, which also contains an interface 60 and a modem 62 of a type cooperating with a hand set 64, which is connected to the telephone 66 of the place where the control is to be carried out.

By ordinary telephone link 68, it is possible to connect to a central processing station 200 via an exchange 201 connected to a telephone 202. This central station comprises a modem 204 cooperating with the hand set 206, an interface 208 and a processing circuit 210. The latter comprises a memory constituting a signature library and comparison means between the signature read and the signatures stored. Thus, circuit 210 solves the problem of "shape recognition". Any known means can be used (operating by correlation or other methods). The central station can return by telephone line 68 any useful information to the user of suitcase 100 and e.g. the identification number of the examined seal or a binary information of the correct/incorrect type.

It is obvious that it is possible to add to the aforementioned means, other known members, such as information locking-unlocking systems, a printer, a keyboard for introducing various informations such as a confidential code, etc.

What is claimed is:

1. A system for monitoring containers comprising:
   an ultrasonic seal fixed to each container, said seal comprising a transmitting transducer and a receiving transducer, said seal being provided with a unique non-reproducible marking,
   a first circuit supplying a voltage step, said first circuit being connected directly to said transmitting transducer,
   a second circuit connected to said receiving transducer, said second circuit being able to receive an electrical signal supplied by said receiving transducer and to supply an output signal,
   signal processing means connected to said second circuit said means being able to analyze the output signal delivered by said second circuit in response to the voltage step applied to the transmitting transducer, said output signal being specific to the seal due to said unique non-reproducible marking.

2. A system according to claim 1, wherein said first circuit comprises a resistor having a first terminal connected to said transmitting transducer and a second terminal connected through a connecting cable to a stabilized d.c. supply, and a switch inserted between said first terminal and earth, the state of said switch being controlled by a low voltage pulse supplied by a pulse source through said connecting cable.

3. A system according to claim 2, wherein said signal processing means are located part in an autonomous suitcase and part in a central processing station, said stabilized power supply being located in said suitcase, said central processing station comprising a memory in which are stored reference signals and a comparison circuit able to compare said reference signals with the signal supplied by the signal processing means, each suitcase being connectable to the central station by modems and a telephone line.

* * * * *